July 27, 1937.　　　E. L. WOOD　　　2,088,125
CREAM REMOVER
Filed Nov. 6, 1935　　　2 Sheets-Sheet 1
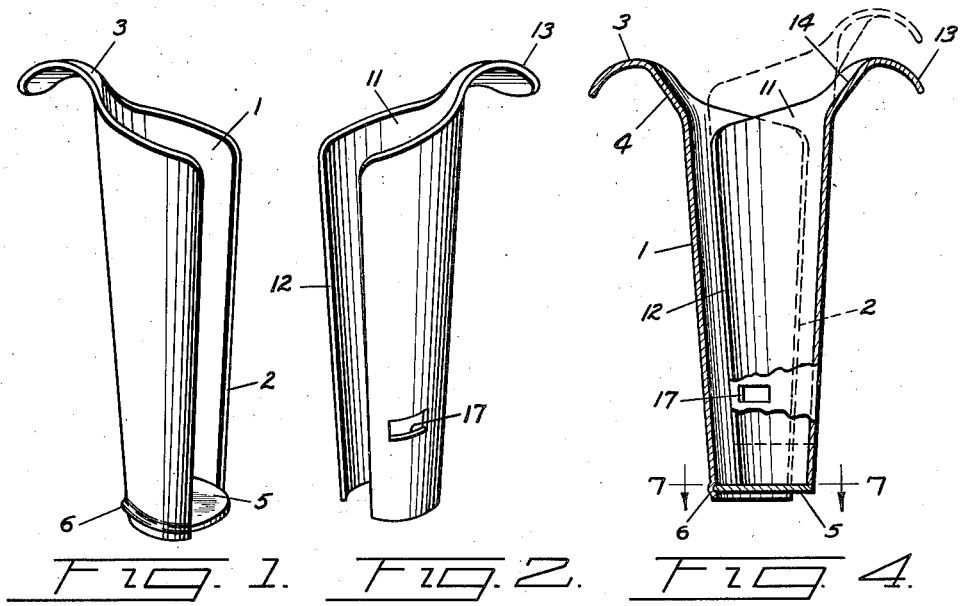
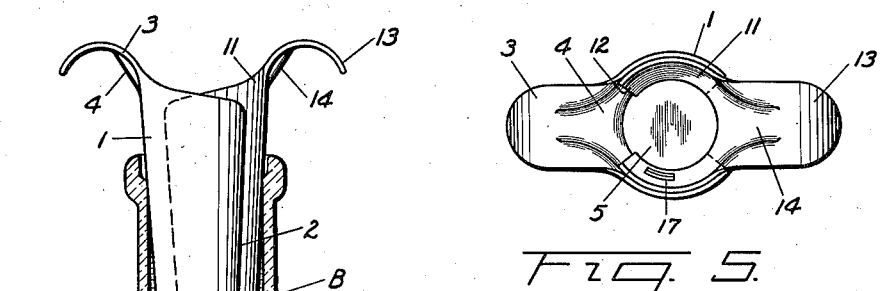
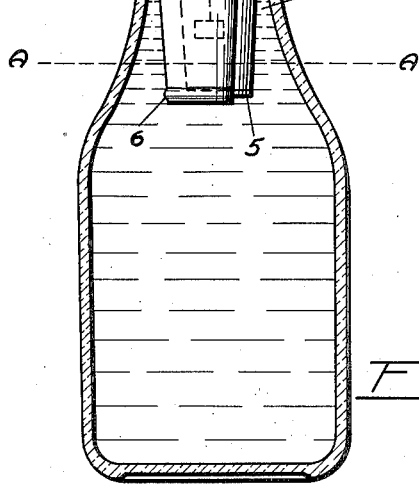
INVENTOR.
EDWARD L. WOOD
BY Barnes, Kisselle, Laughlin & Raisch
ATTORNEYS.

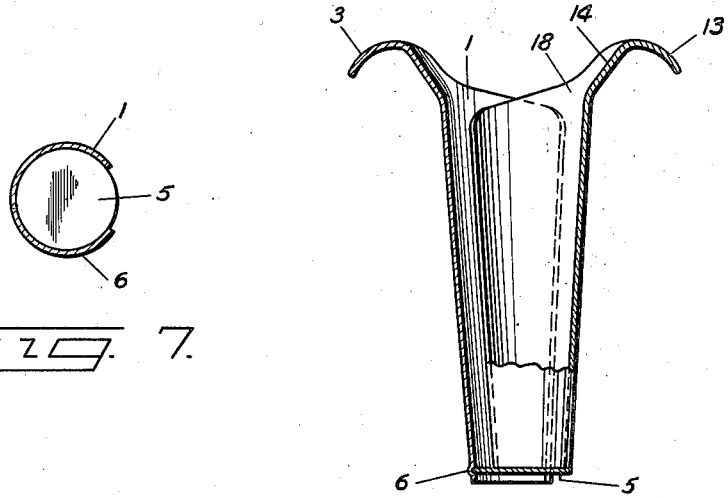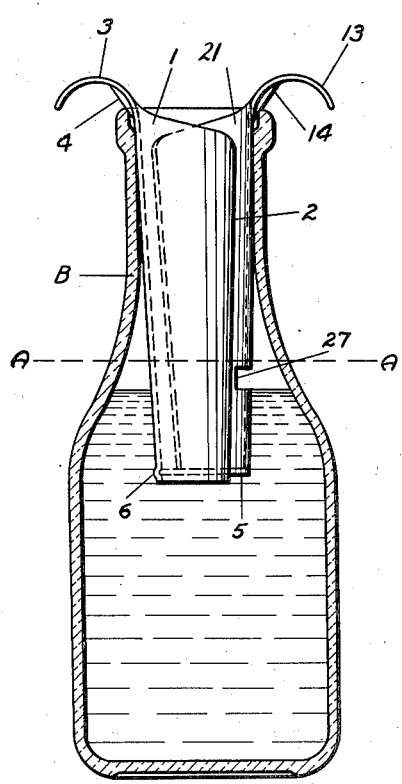

Patented July 27, 1937

2,088,125

UNITED STATES PATENT OFFICE 2,088,125

CREAM REMOVER

Edward L. Wood, Detroit, Mich.

Application November 6, 1935, Serial No. 48,453

9 Claims. (Cl. 210—51.5)

This invention relates to a device to be used for obtaining the cream which rises to the top of a body of milk. More specifically, the device is arranged to be used for removing cream from the ordinary milk bottle.

The objects of the invention include the provision of a simple, sanitary, easily operated device for removing cream from milk bottles and which may be used as a pouring device. The device is to be inserted into a full bottle of milk and is so arranged that its displacement is almost negligible so as to not overflow the contents of a full bottle. From a sanitary standpoint, the device is constructed so as to not have inaccessible seams, corners or cracks so that it can be thoroughly cleaned and so that deposits of milk or cream will not be entrapped in such places and become sour or otherwise partly disintegrated, and the contents of the bottle may be poured from the bottle using the device as a pouring device so that the contents are protected from contact with the mouth of the bottle. Thus any extraneous matter or germs on the mouth of the bottle do not contact with the milk or cream as poured. Along this line, it may be mentioned that there have been times when trench mouth germs have been found on the mouth of milk bottles. Moreover, the invention contemplates a device of simple structure capable of easy manufacture, and of cheap manufacture so that the public may have the benefits thereof at an extremely low cost. These and other objects will become more apparent as the detailed description progresses and as such description is read in conjunction with the accompanying drawings.

Fig. 1 is a view of one member of the device.

Fig. 2 is a view of another and cooperating member.

Fig. 3 is a view showing a bottle in cross section and showing the device in operative position.

Fig. 4 is a cross sectional view of the two members in operative relation showing a dotted line position for one member in which position a different function may be performed.

Fig. 5 is a top view looking at the members in interfitted relation.

Fig. 6 is a similar view showing the members turned through substantially 90°.

Fig. 7 is a cross sectional view taken on line 7—7 of Fig. 4.

Fig. 8 is a cross sectional view similar to Figure 4 showing a modified form.

Fig. 9 is a view of a member to be used with the modified form shown in Figure 8.

Fig. 10 is a view showing a bottle in cross section and illustrating a certain operation of the device.

The cream remover may comprise essentially two parts. One of these parts is shown at 1 and it is made preferably of a sheet material such as a suitable composition or metal preferably of springy nature. The member 1 is generally of circular form in cross section having a vertical opening or slot 2 and advantageously of tapering form from top to bottom. The member may have a curved extension 3 which may be depressed to form a channel-like formation 4 which serves not only to strengthen the extension 3 but also serves as a sort of a trough from which cream and milk may be poured. The member 1 has a bottom piece 5 which is shown as of disk form. This piece may be removably held in position by the spring tension of the metal of the member 1 and the member 1 may be provided with the grooved formation 6 in which the disk fits. By making the member 5 removable, all parts may be readily cleansed. However, the disk member 5 may be permanently united to the member 1 if so desired. To position the disk 5, it may be moved downwardly relative to the member 1 with the fingers of the operator gripping the same and moving through the opening 2 until the same snaps into the recess 6. It may be removed by similar relative movement either upwardly or downwardly.

A second member 11 is similarly formed preferably of springy sheet metal or composition and it has an opening 12 extending from top to bottom and an extension 13 similar to the extension 3 and formed with a trough 14 similar to the trough 4. In one form of the invention the member 11 may have an opening 17 positioned relatively close to one edge of the member 11 which defines the opening 12 for purposes which will presently appear.

In a modified form of the invention as shown in Figure 8, the member 1 may be identical with the member 1 previously described and the same reference characters will apply thereto. In this case, however, the member 18 differs from the member previously described in that it lacks the opening 17. In this form a third member is provided shown at 21 in Figure 9 which is of the same structure as the member 11 shown in Figure 2 having the extension 13 but it has an opening 27 located substantially midway between the edges defining the vertical opening 12.

The device is used as follows: The member 1 is first inserted into a full bottle as shown in Figure 3 and is preferably pushed into the bottle until the bottom disk 5 is at about the cream line as indicated in Figure 3. The bottle is shown at B. Due to the fact that the member is of thin sheet material, its displacement is small and the contents of the bottle are not caused to overflow. Next the member 11 is disposed within and in telescoping relation with the member 1 and then pushed downwardly until the lower edge seats upon the disk 5. The parts may be accurately made so that a very close and tight joint is effected when the member 11 seats on the disk 5. It will now be observed that a quantity of cream is entrapped within the cream remover. In manipulating the members, the extensions 3 and 13 may serve as handles. Now the bottle may be tipped and the cream poured out of its enclosure preferably with the cream poured out over the extension 3. The sheet metal of member 1 is compressed as it is pushed into the bottle, and due to its expanding action it seals quite tightly in the neck of the bottle. In fact, the seal is tight enough so as to prevent any substantial flowing of milk out of the joint between the neck of the bottle and the member 1. When the cream is poured out over the projection 3, the member 11 is uppermost, and the small crack caused by the overlap serves as a vent opening. Instead of pouring the cream out in this manner the assembled cream remover may be withdrawn from the bottle with its cream contents.

After this operation has been performed, there will still remain some cream on the top of the milk. This cream comes from the space X and will settle, say for example, to the line marked A. If it is desired to remove this cream, the member 1 is turned to the position shown in Figure 6 where the aperture 17 is exposed through the slot 2. It will be noted that the opening 17 is closed by the member 1 in the position shown in Figure 5 in the first operation. In the event that the form shown in Figure 8 is used, wherein the member 11 has no aperture, the member 11 is replaced by member 21 having an aperture 27. The two parts may be then assembled and both urged downwardly into the bottle as shown at Figure 10. The bottom portion projects into the milk and as the opening 27 or the opening 17 arrives at the cream line A, the cream will begin to pour into the remover and will fill the same up to the opening; whereupon this cream may be poured out as above described or the remover may be withdrawn from the bottle with the cream held therein. The opening 17 and the opening 27 are preferably placed far enough above the bottom so as to form a receptacle in the lower portion of the device large enough to hold the residual cream which settles after the removal of the first body of cream.

The device may also be used as a pouring instrument; for example, with the parts in position as shown in Figure 10, much of the contents of the bottle may be poured out over the projection 3, the same entering the aperture 27 and air venting in through the crack at the edges of the member 11. This same action may be obtained when the parts 1 and 11 are adjusted as shown in Figure 6, in which event the poured contents may enter the aperture 17. Also, for pouring purposes the member 11, 13, or 21 may be raised relative to the member 1 as shown by the dotted line position of Figure 4. Now the contents flow into the remover between the disk 5 and the lower edge of the raised member and then out through the remover and over the projection 3. In this way the contents of the bottle may be poured therefrom and the milk held from contact with the edge of the bottle.

While this device has been described as a cream remover and specified as being particularly useful with milk bottles, it is, of course, not limited to such use. In principle the structure may be employed for removing the upper strata of any sort of a liquid in any kind of a container whether a milk bottle or other type of bottle or can be provided with a suitable opening or mouth to receive a device of the type described.

I claim:

1. A device for removing some of the liquid in the upper portion of a container comprising, a member formed of thin material fashioned into a substantially circular form in cross section and tapering from one end to the other with the small end of less diameter and the large end of greater diameter than the mouth of the container, adapted to be inserted through the mouth of the container with its walls making substantial contact with the mouth of the container, said member having a lengthwise extending slot, a bottom closure piece for said member, and a second member fashioned from thin material substantially circular in cross section and similarly tapering from one end to the other, having a slot running substantially from one end to the other and open at both ends, said second member adapted to be telescopingly fitted to the first member with the slots substantially opposed whereby each member closes the slot of the other and the second member adapted to substantially seal against the bottom closure piece of the first member to form a substantially closed receptacle.

2. A device substantially for the purpose described comprising, a member fashioned from thin material of a springy nature with the edges of the sheet material spaced apart to form a slot, said member being of tapering form and the small end adapted to be inserted into the mouth of a liquid container, the tapering form and springy nature of the material causing the member to make a relatively tight resilient contact with the mouth of the container, a bottom piece for the small end of the member, and a second member similar to the first, except that it is bottomless, adapted to telescopingly fit the first member and substantially seal against said bottom with each member closing the slot of the other, whereby the members, when in telescopingly fitted relation, form a substantially closed receptacle for confining some of the liquid in the upper part of a container and form a substantial frictional seal with the mouth of the container.

3. A device for removing cream from the upper portion of a milk bottle comprising, a hollow tapering member having a slot running substantially from one end to the other and adapted to be wedged into a bottle, a closure piece at the lower end thereof, a second member of similar hollow and slotted form, open at its bottom and adapted to be telescoped into fitting relation with the first member and wedged into a bottle whereby one member closes the slot of the other and with the second member substantially sealing against the bottom piece of the first member to form a substantially closed receptacle and with the members resiliently sealing the bottle mouth, one member having an aperture therein positioned to be closed by the other member when the slots of the members are substantially opposed, the said members being capable of being telescopingly fitted together with said aperture in one member in alignment with the slot in the other member, and said aperture being positioned substantially above the lower end of the members whereby a substantially closed receptacle is formed below said aperture when the aperture is in alignment with said slot.

4. A device for removing cream from the upper portion of a milk bottle comprising, a pair of hollow members of tapering form and of circular shape in cross section and adapted to telescope one within the other, each member having a slot extending substantially from one end to the other whereby the members may be wedged and compressed into the bottle with the material thereof flexing inwardly, one member having a bottom piece at its lower end and the other being open, said members adapted to be telescoped one within the other while extending through the mouth piece of the bottle, with each member closing the slot of the other and with the open bottom member sealing against the open piece of the other whereby to entrap a quantity of cream, each member having a laterally extending operating piece at its upper end, and said members being turnable relative to each other, one member having an aperture through its wall positioned above the lowermost edge thereof which is closed by the wall of the other member when the slots are opposed, and which is in alignment with the slot in the other member when said members are turned relative to each other.

5. A device for removing cream from the upper portion of a milk bottle comprising, a hollow tapering member having a lengthwise running slot, the smaller end being smaller in cross dimensions than the mouth of the bottle and adapted to freely pass thereinto, the larger end being of larger cross dimensions than the mouth of the bottle, the material of the member being resilient whereby the same may be wedged into the bottle mouth to seal against the same, a closure piece at the small end of the member, another member of similar shape adapted to telescopingly fit the first to substantially seal against the closure piece, the respective members closing the slot of the other, and said second member being of resilient material whereby it may be compressed as it is forced into the bottle, and said two members tending to expand outwardly whereby to engage the inside of the mouth of the bottle to form a substantial seal.

6. A device for removing a quantity of liquid from the upper portion of a container comprising, a hollow tapering member formed of springy sheet material having a lengthwise running slot, a closure piece at the small end of the member, the small end having cross dimensions less than the mouth of the container and adapted to freely pass thereinto and the larger end having cross dimensions greater than the mouth of the container, another and similar tapering hollow member of resilient sheet metal adapted to telescopingly fit the first member and to substantially seal against the closure piece of the first member, with the respective members covering the slot of the other, said members adapted to be constricted when they are inserted into the mouth of the container with pressure whereby to engage in the mouth with an outward springing tendency to substantially seal against the mouth of the container, said members forming a substantially closed receptacle from which the liquid entrapped therein may be poured while said members substantially seal the mouth of the container.

7. A device for removing a quantity of liquid for the upper portion of a container comprising, a hollow tapering member formed of springy sheet material having a lengthwise running slot, said member being substantially circular in cross section, a closure piece at the small end of the member, the small end having a diameter less than the mouth of the container and adapted to freely pass thereinto and the larger end having a diameter greater than the mouth of the container, another and similar tapering hollow member of resilient sheet material adapted to telescopingly fit the first member and to substantially seal against the closure piece of the first with the respective members covering the slot of the other, said members adapted to be constricted when they are inserted into the mouth of the container with pressure whereby to engage in the mouth with an outward springing tendency to substantially seal against the mouth of the container, said members forming a substantially closed receptacle from which the liquid entrapped therein may be poured, while said members substantially seal the mouth of the container.

8. A device for removing cream from the upper portion of a bottle comprising, a pair of slotted tapering hollow members of springy sheet material, each generally circular in cross section and one having a closure piece at its smaller end, said members adapted to be telescoped together to form a cup-like compartment with one member closing the slot in the other, the small end of the members having diameters less than the mouth of the bottle and the large end of the members having diameters larger than the mouth of the bottle, said members adapted to be pressed into the mouth of the bottle, whereby they may be constricted so that the expanding tendency thereof forms a substantial seal in the bottle mouth.

9. A device for removing cream from the upper portion of a bottle comprising, a pair of slotted tapering hollow members of springy sheet material, each generally of circular form in cross section and one having a closure piece at its smaller end, said members adapted to be telescoped together to form a cup-like compartment with each member closing the slot in the other, the small end of the members having diameters less than that of the mouth of the bottle and the large end of the members having diameters larger than the mouth of the bottle, said members adapted to be pressed into the mouth of the bottle, whereby they may be constricted so that the expanding tendency thereof forms a substantial seal in the bottle mouth, said members being substantially of a uniform tapering shape from one end to the other whereby to accommodate bottle mouths of varying diameters.

EDWARD L. WOOD.